United States Patent [19]

Glajch et al.

[11] Patent Number: 4,847,159
[45] Date of Patent: * Jul. 11, 1989

[54] SUBSTRATES COATED WITH ORGANO-SILANES THAT ARE STERICALLY-PROTECTED

[75] Inventors: Joseph L. Glajch; Joseph J. Kirkland, both of Wilmington, Del.

[73] Assignee: E. I. Du Pont de Nemours and Company, Wilmington, Del.

[*] Notice: The portion of the term of this patent subsequent to Nov. 10, 2004 has been disclaimed.

[21] Appl. No.: 119,393

[22] Filed: Nov. 10, 1987

Related U.S. Application Data

[63] Continuation-in-part of Ser. No. 936,084, Nov. 18, 1986, Pat. No. 4,705,725.

[51] Int. Cl.$^4$ ................................................ B32B 9/00
[52] U.S. Cl. ................................. 428/447; 428/405; 428/407; 428/429; 428/702; 55/67; 210/656; 210/660; 436/527
[58] Field of Search ............ 428/403, 405, 407, 411.1, 428/429, 447, 702; 55/67; 210/656, 660; 436/524, 523, 531, 532; 521/30

[56] References Cited

U.S. PATENT DOCUMENTS

| | | | |
|---|---|---|---|
| 3,722,181 | 3/1973 | Kirkland et al. | 55/67 |
| 3,795,313 | 3/1974 | Kirkland et al. | 210/198 |
| 4,340,496 | 7/1982 | Abbott | 252/184 |
| 4,432,877 | 2/1984 | Tzodikov | 210/656 |
| 4,478,952 | 10/1984 | Mack et al. | 502/110 |
| 4,560,704 | 12/1985 | Regnier et al. | 521/31 |
| 4,705,725 | 11/1957 | Glajch et al. | 428/407 X |

FOREIGN PATENT DOCUMENTS

| | | | |
|---|---|---|---|
| 0106327 | 11/1984 | European Pat. Off. | |
| 1540715 | 2/1979 | United Kingdom | 31/8 |
| 2092017 | 8/1982 | United Kingdom | 31/22 |

OTHER PUBLICATIONS

R. E. Majors (High-Performance Liquid Chromatorgraphy, Advances and Perspectives, vol. 1, C. Horvath, ed., Academic Press, 1980, pp. 80-84.
Lindgren et al. J. Chromatogr., vol. 2986 (1984) 83-95.
K. K. Unger et al., J. Chromatogr., vol. 125 (1976) 115-127.
G. E. Berendsen and L. de Galan, J. Liquid Chromatogr., 1 (1978) 561.
C. A. Ku, J. D. Henry, R. Siriwardane and L. Roberts, J. Colloid Interface Scie., 106 (1985) 377-387.
Lalonde et al., Synthesis, vol. 9 (1985) 817.
Corey et al. Tetrahedron Letters, vol. 22, 3455 (1981).
Poole et al. J. Chromatogr. vol. 187 (1980) 331, 40.
Szabo et al. Helvetica Chimica Acta, vol. 67 (1984) 2128.
Drago et al. Inorg. Chem., vol. 24 (1985) 1983.

*Primary Examiner*—Ellis P. Robinson
*Assistant Examiner*—Susan S. Rucker

[57] ABSTRACT

This invention involves unique compositions consisting of substrates coated with organo-silanes that are sterically protected by a single bulky group. This material consists of an appropriate reactive solid to which is attached a silane whose silicon stom is bonded to a functional group that contains a dimethyl-substituted tertiary carbon.

17 Claims, No Drawings

SUBSTRATES COATED WITH ORGANO-SILANES THAT ARE STERICALLY-PROTECTED

CROSS REFERENCE TO RELATED APPLICATION

This application is a continuation-in-part of an application Ser. No. 936,084, filed Nov. 18, 1986 now U.S. Pat. No. 4,705,725 and entitled "Substrates with Sterically-Protected, Stable, Covalently-Bonded Organo-Silane Films".

TECHNICAL FIELD

This invention relates to novel stable support structures comprising a hydrated metal oxide or metalloid oxide, or a solid organic polymer substrate, to which is covalently attached a monofunctional silane containing a single sterically-protecting group attached to the silicon atom of the silane. This invention also relates to processes for the production of such support structures.

The products and processes of this invention are useful in a wide variety of applications including: efficient, highly stable packings for chromatographic separations, both for analysis and large-scale isolations; stable, selective media for affinity chromatography separations; highly-selective catalysts for liquid-phase reactions; the solid-phase synthesis of peptides, proteins, and oligonucleotides: stable, efficient matrices in peptide and nucleotide synthesizer instruments; and, highly selective phases in peptide and protein sequencing.

BACKGROUND OF THE INVENTION

R. E. Majors (High-performance Liquid Chromatography, Advances and Perspectives, Vol. 1, C. Horvath, ed., Academic Press, 1980, pp. 80–84) describes the commonly used monolayer, monofunctional bonded-phase silicas. These bonded-phase silicas are employed in chromatographic applications and do not utilize sterically-protecting groups to create materials that are stable to a wide range of operating conditions. U.S. Pat. Nos. 3,722,181 and 3,795,313 (J. J. Kirkland and P. C. Yates) deal with products and processes for chromatographic packings with polymeric stationary phases prepared from bi- or tri-functional silanes, and do not involve surfaces with sterically-protected monofunctional silanes. German Pat. No. DE 2,605,789 (J. H. Knox and A. Pryde) describe bonded-phase materials for liquid chromatography prepared by reacting silica supports with trimethyl- or triethyl-silane groups: no use of special sterically-protecting groups was made. The concept of utilizing sterically-protecting groups was also not employed by Lindgren et al. (J. Chromatogr., Volume 296 (1984) 83–95), for materials prepared from single or mixed monofunctional silanes, including triethylchlorosilane. K. K. Unger et al. J. Chromatogr., Volume 125 (1976) 115–127 describe the synthesis of bonded-phase materials for chromatography, including those containing diphenylsilyl-, triphenylsilyl-, and n-butyldiphenylsilyl- groups. The planar phenyl groups do not provide the steric protection required to produce highly stable, effective chromatographic packings.

The reaction of t-butylchlorodimethylsilane with silica gel to form a chromatographic packing was reported by G. E. Berendsen and L. de Galan (J. Liq. Chromatogr., 1 (1978) 561). These workers found very low retention and poor selectivity with the dimethyl-t-butyl bonded phase, which they attributed to the very low coverage with this functionality and a high concentration of residual SiOH groups on the silica surface after reaction. Glass beads also were reacted with t-butylchlorodimethylsilane (C. A. Ku, J. D. Henry, R. Siriwardane and L. Roberts, J. Colloid Interface Sci., 106 (1985) 377–387). In both of these studies, silanes with groups other than dimethyl on the silicon atom were not described. Substituted t-butyl protecting groups also were not disclosed.

Co-pending application Ser. No. 06/936,084 discloses the use of monofunctional silanes containing at least two sterically-protecting groups attached to the silicon atom of the silane. Compositions with a single protecting group were not disclosed.

A general review of organosilicon reagents for protecting certain functional groups of soluble compounds in organic synthesis is given by Lalonde et al. [Synthesis, Volume 9, (1985) 817]. Corey et al [Tetrahedron Letters, Volume 22, 3455 (1981)] describe the triisopropyl-silyl hydroxyl protecting group as providing strong steric screening for the silicon atom to which it is attached, as well as the atom attached to the silicon. This is in contrast to trimethylsilyl or triethylsilyl protecting groups. The triisopropylsilyl group was not used with any solid substrates. The reagent, t-butylpentafluorophenylmethyl-chlororsilane was used for the formation of hydrolytically stable, alkylsilyl derivatives by Poole et al. [J. Chromatogr., Volume 187 (1980) 331, 40]. No solid substrates were employed, and in this case only one sterically-protecting group was present on the silane reagent. U.S. Pat. No. 4,478,952 (M. P. Mack and C. T. Berge) describes $Ti(OSi(isopropyl)_3)_4$ as soluble, supported catalysts for olefin polymerization; no covalent bonding to a substrate was involved.

Szabo et al. [Helvetica Chimica Acta, Volume 67 (1984) 2128] describe the grafting of dimethylneopentylsilane to the surface of fumed silica. The use of a single neopentyl group does not afford the steric protection required to achieve a highly stable packing. The use of silane reactions with silica in which $R_3SiCl$ was employed, where R = methyl, ethyl, propyl (NOT isopropyl), was described by Drago et al. [Inorg. Chem., Volume 24 (1985) 1983]. No sterically-protecting groups of the type used in this invention were utilized. None of the above references disclose materials or processes that are a feature of this invention.

The silane bonded phases described to date suffer from the disadvantage of being hydrolytically unstable in aggressive mobile phases such as those containing trifluoroacetic acid at pH<3. This results in decreased column lifetime as well as excessive "bleeding" of the bonded phase into the mobile phase and gives less than pure components from the separation. The support structures of this invention have bonded phases with improved stability.

SUMMARY OF THE INVENTION

This invention comprises stable support structures comprising a substrate, to which is attached a monofunctional silane containing at least one dimethyl substituted, tertiary carbon atom attached to the silicon atom of the silane which forms a sterically-protecting group, and additional functional groups, R, $R_1$, and $R_2$ arranged in the following manner:

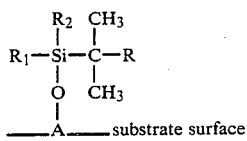

where, R, $R_1$ and $R_2$ are alkane, substituted alkane, alkene, substituted alkene, aryl, or substituted aryl, but specifically excluded are structures in which $R=R_1=R_2=H$, $R=R_1=R_2=CH_3$, $R_1=R_2=H$ and $R=CH_3$, or $R_1=R_2=CH_3$ and $R=H$. More simply stated the excluded structures are $R=R_1=R_2=CH_3$ since the alkanes, aryls, and alkenes do not include H taken alone.

The sterically-protecting, dimethyl substituted, tertiary carbon moiety attached to the silicon atom of the silane imparts surprising stability to these support structures.

DETAILED DESCRIPTION OF THE PREFERRED EMBODIMENTS

Uses for the Invention

The novel, stable support structures of this invention constitute new, efficient, highly-stable media for chromatographic separations. They are especially useful as high-performance liquid chromatography (HPLC) packings for separating biological macromolecules of a wide variety, but particularly those compounds that must be handled in aggressive mobile phases such as those containing trifluoroacetic acid at pH<3. The support structures of this invention can be an order-of-magnitude more stable in such aggressive environments, while still providing conditions for optimum retention and column efficiency. Such characteristics are desirable for the reproducible analysis of mixtures, but are especially important for the large-scale of process-scale isolation of purified components. The support structures of this invention exhibit characteristics that are in strong contrast to existing HPLC column packings, that show excessive "bleeding" of the organic stationary phase in such isolation applications, resulting in significant contamination of the isolated product with elements of the "bleeding" or column degradation process. Therefore, the new products of this invention permit highly superior HPLC separations by reversed- and normal-phase chromatography, ion-exchange chromatography, size-exclusion chromatography, and hydrophobic-interaction chromatography.

A specific use in chromatography for the materials in this invention is in the "end-capping" process for chromatographic packings discussed on page 139 of W. R. Melander and C. Horwath, in "High-Performance Liquid Chromatography, Volume 2", C. Horwath, ed. Academic Press, New York, 1980. In this approach trimethylchlorosilane typically is used to "cap-off" active, residual silanol groups after silanization reactions, to reduce undesired adsorptive processes and improve batch to batch reproducibility of packings. The sterically-protected silanes used in this invention produce significantly more stable "end-capped" products, resulting in improved reproducibility over long-term use.

Another important use of this invention is in affinity chromatography. The support structures of this invention permit affinity separations to be performed on stable, efficient media. One of the present severe limitations in the use of biologically-active covalently-bound affinity exchange groups is the continuous, significant loss or "bleed" of this ligand from the packing during use. This process results in decreased loading capacity for the separating medium, with decreased yields. In addition, the "bleeding" ligand can significantly contaminate the purified product. The novel structures of this invention now permit affinity separations to be carried out on silica supports that have the desired mechanical properties of strength and optimum pore size, with greatly reduced loss of bound ligand during use. This results in a large increase in the lifetime of the separating medium, and a significant decrease in the potential for contamination of the final purified product.

The products of this invention are also useful as catalysts for liquid-phase reactions. Highly-selective organic- and organo-metallic ligands can be covalently attached to siliceous or other ceramic supports having optimum mechanical characteristics, to produce stable, active catalysts that have the same desirable long-lifetime and effective properties as those described for the affinity materials above.

Still another use of the present invention are stable support structures for the solid-phase synthesis of peptides, proteins, and oligonucleotides. Present materials used in these applications exhibit relatively poor lifetime, causing problems with reproducibility of results and the necessity for frequent replacement of the media used in the synthetic process. The new structures of this invention should be especially effective as stable, efficient media in peptide, protein, and nucleotide synthesizer instruments, greatly moderating some of the existing problems associated with this technology.

This novel support structures of this invention also represent significant advances in the technology of characterizations by specific binding. The use of stable, efficient, highly-selective organic-containing phases covalently bound to optimum solid surfaces measurably improve the methodology of peptide and protein sequencing. The support structures of this invention provide the means for optimizing both the chemical and physical characteristics of materials that act as the media for surface reactions utilized for specific-binding analyses.

The Substrate

The substrate of this invention is a solid, as distinguished from a liquid or a gas. In one embodiment it can be a metal-oxide or metalloid oxide, but it can be an organic polymer or plastic which will flow under a definite, applied stress. In the most useful embodiments of the novel compositions, the substrate will be stable to normal reaction temperatures. In many cases these temperatures may be in the 150° C. range and preferably should extend to 200° C. and above.

The substrate must have a surface that will react with the silane reagents described below. For example, rigid inorganic solids such as silica or chromia should be hydrolyzed, so that surface —OH groups will be available for reaction with the silane reagent. Alternatively, the surface of these materials can be altered with other appropriate groups that allow reaction with silanes. For example, the surface of carefully dried silica can be chlorinated with silicon tetrachloride or thionyl chloride. This chlorinated surface can then be reacted with silane reagents containing reactive Si—H or Si—OH groups to prepare the support structures of this invention. Preferred metal- or metalloid-oxide substrates include silica (most preferred), chromia, and tin oxide, but other substrates of this classification are not excluded.

In some cases, it is desirable to coat a rigid substrate with an appropriate metal- or metalloid-oxide film that can then be made to react with the appropriate silane reagents. For example, titania can be coated with a thin film of silica according to the method described by Iler ("The Chemistry of Silica," John Wiley and Sons, New York, 1979, p. 86). This thin coating of silica can then be hydrolyzed, if necessary, and reacted with the appropriate silane reagent.

The Silane Reagents

The silanes used to prepare the unique products of this invention must be monofunctional and contain at least one sterically-protecting dimethyl substituted, tertiary carbon moiety attached to the silicon atom of the silane. Thus, the silanes embodied in this invention assume the following structure:

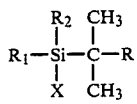

where, X=reactive groups such as chlorine, bromine, iodine, amino, hydroxyl, alkoxy, hydrogen, groups containing $-C=C-$, etc.; R, $R_1$ and $R_2$=alkane, substituted alkane, alkene, substituted alkene, aryl, or substituted aryl, but specifically excluded are structures in which $R=R_1=R_2=H$, $R=R_1=R_2=CH_3$, $R_1=R_2=H$ and $R=CH_3$, $R_1=R_2=CH_3$, and $R=H$. For convenience, these silanes are referred to as sterically-protecting silanes.

The silanes of this invention must contain at least one dimethyl substituted, tertiary carbon moiety attached to the silicon atom of the silane. The R group associated with this moiety may be a methyl (simple t-butyl group), but in this case the $R_1$ group of the silane also must not be a methyl; structures in which R and $R_1$ are both hydrogen are also specifically excluded. (These excluded structures have undesirable properties in the intended applications). Structures with R=methyl are generally preferred (providing that $R_1$ is also not methyl). Such structures containing the simple t-butyl group are readily synthesized, and are generally effective in sterically protecting the Si—O— bond that attaches the silane to the substrate. The R group can also consist of larger functionalities (e.g., ethyl, isopropyl), but are less preferred because of greater difficulty in preparation.

Large, bulky silanes are especially undesirable, since they can only be reacted with the substrate surface in low yields (because of steric crowding on the surface), and are generally more costly to prepare. Also, in some applications the high level of hydrophobicity exhibited by these large, bulky groups can be extremely deleterious. For example, R-groups such as n-octyl- show significant hydrophobic interaction (reversed-phase effect) that results in unwanted adsorptive retention in aqueous size-exclusion liquid chromatography that requires packings that are substantially free of hydrophobic sites.

Preferred silanes for products of this invention contain a dimethyl-substituted tertiary carbon that has the steric properties to protect the bonded silane from hydrolysis. The R and $R_1$ groups in the silanes usually are not the same (and must not both be hydrogen or methyl). It is sometimes desirable to make R and $R_1$ a different size so that, because of steric factors, the silane is arranged on the surface of the substrate so as to provide optimum access to the interacting species of interest. For example, R=methyl assists in stabilizing the silane against hydrolysis and $R_1=C_8$ provides a strong hydrophobic character to the stationary phase for reversed-phase chromatography. By appropriate manipulation of R and $R_1$ groups, it is feasible to prepare a material that minimizes the tendency of the stationary phase to denature (cause conformational changes to) biological molecules such as proteins.

Even though there may be incomplete coverage of the surface, materials with the sterically-protecting group of this invention still exhibit superior stability and utility. Thus, support structures with less than complete coverage, either because of "steric crowding", or because the reaction was deliberately starved with silane reactant, still exhibit the level of stability obtained by support structures whose surfaces are completely reacted. This finding is contrary to the commonly-accepted principle that a dense (completely reacted) monolayer of functional groups instead of partial coverage, is necessary to obtain stable materials [see, K. K. Unger et al., J. Chromatogr., Volume 125 (1976) 115]. The superior stability is due to the sterically-protecting group involved in this invention.

The silicon atoms within the silanes of this invention must not be multifunctional, i.e., they must be monofunctional —SiX, and not —SiX2 or —SiX3, (where X=reactive groups such as halogen, alkoxy, siloxy, etc.), since these latter types of reagents will tend to polymerize during reaction or use (react with itself or other silane molecules), resulting in irreproducible surfaces with different chemical and physical characteristics. A high degree of reproducibility is especially important in chromatographic uses where repeatability of retention is a critical factor. Multifunctional silanes also only partially react with a surface, leaving a reactive group that can ultimately undergo unwanted reactions with materials being handled. Alternatively, these residual reactive groups can hydrolyze to acidic silanols that can deleteriously interact with the materials of interest. On the other hand, the monofunctional silanes utilized in this invention can react only in one configuration, resulting in reproducible surfaces of known structures.

The silanes utilized to prepare the support structures of this invention can contain a variety of functional groups to fit the intended application. The interactive functional groups are usually incorporated in the $R_1$ groups of the silane structure. For example, in reversed-phase chromatography carried out in the manner described in Chapter 7 of "Introduction to Modern Liquid Chromatography" (L. R. Snyder and J. J. Kirkland, John Wiley and Sons, New York, 1979), it is desirable for $R_1$ of the silane to consist of alkyl or aryl groups such as C3, C4, n-C8, n-C18, etc., to enable the desired hydrophobic interaction for retention to occur. For ion-exchange chromatography the $R_1$-groups can contain groups with ion-exchange functions, for example, $(CH_2)_3N^+(CH_3)_3$ as an anion-exchanger, and $-(CH_2)_3-C_6H_4-SO_3H$ as a cation-exchanger. For size-exclusion chromatography, particularly for the separation of highly polar, water-soluble biomacromolecules such as proteins, the surface of the substrate are modified with highly polar $R_1$ groups, such as $-(CH_2)_3-O-CH(OH)-CHOH$, the so-called "diol" function. For hydrophobic interaction chromatography, a weakly hydrophobic stationary phase is desired on the support.

For example, $R_1$ =methyl-, ethyl-, n-propyl, or isopropyl provide the modest hydrophobic interaction required by this mode of chromatographic retention. In the case of normal-phase chromatography, polar functional groups are incorporated into the silane as $R_1$ groups, for example, —$(CH_2)_3$—$NH_2$ and —$(CH_2)_3$—$CN$.

For affinity chromatography support structures, the substrate can first be reacted with a monofunctional silane containing appropriately reactive $R_1$-groups such as —$(CH_2)_3$—$NH_2$. These groups can then be further reacted with ligands of specific biological activity to produce the affinity support structure needed to perform the desired sing appropriately reactive $R_1$-groups such as —$(CH_2)_3$—$NH_2$. These groups can then be further reacted with ligands of specific biological activity to produce the affinity support structure needed to perform the desired sing appropriately reactive $R_1$-groups such as —$(CH_2)_3$—$NH_2$. These groups can then be further reacted with ligands of specific biological activity to produce the affinity support structure needed to perform the desired sing appropriately reactive $R_1$-groups such as —$(CH_2)_3$—$NH_2$. These groups can then be further reacted with ligands of specific biological activity to produce the affinity support structure needed to perform the desired separation. If $R_1$ contains an epoxide group, the amino terminus of a protein or peptide ($RNH_2$) can be linked by diect reaction to form structures of the type:

—CH(—OH)—CH$_2$—NHR

The epoxide also can be first hydrolyzed to form a "diol" group, and then activated with a variety of other reagents.

Sterically-protected monofunctional silance reagents also are used to prepare support structures that have uses as catalysts for liquid phase reaction. For use as acid or basic catalysts, strongly acidic sulfonic acids groups or strongly basic quaternary amines groups respectively can be incorporated in the silane structure in the same manner as described for the ion-exchange chromatography packings above. Ligands containing metals, such as platinum and palladium, either as an ion or in an organo-metallic complex, can be built into the support structures of this invention, for selective catalysts by oxidation or reduction.

Alternatively, functionalities to permit polymerization/crosslinking reactions may be attached in the R and/or $R_1$ positions of the silane. Following reaction of the silane with the substrate, the silane can be cross-linked or polymerized with itself, or a copolymer may be prepared on the support surface by contacting the covalently-bonded reactive silane with an appropriate reagent and initiating a reaction. For example, R=methyl (for stabilization), $R_1$ =—$CH_2$—$CH$=$CH_2$ provides the functionality to permit the crosslinking of the bonded silane to other unsaturated monomers or polymers, such as acrylonitrile to yield nitrile groups on the structure, or poly(vinylpyrrolidone) to produce a stable, highly polar, polymeric surface. Such polymerization/crosslinking reactions can be carried out using conventional free-radical initiators such as peroxides, or they may be initiated by other means such as high energy radiation as described in G. Schomburg, H. Figge, A. Deege, and J. Kohler, J. Chromatogr., 351 (1986) 393.

The support structures of this invention also can be used in solid-phase synthesis techniques, such as in the preparation of synthetic oligonucleotides and peptides. In this application, synthesis is achieved by the repetitive addition of individual nucleotides or amino acids to the bonded, activated silane, to prepare the desired final product, which is usually 5 to 50 units in length. The success of these syntheses depends upon many factors, one of which is the chemical stability of the substrate-to-silane bond that binds the silane containing the activated groups.

For oligonucleotide synthesis, it is customary to begin with an aminopropylsilyl-modified substrate, and attach one of the four dimethoxytrityl nucleotides through an aminopropyl-succinamide linkage. The desired additional bases are the added through a phosphoramidite synthetic route. Details of such approaches have been reported by E. Ohtsuka et al. [Nucleic Acids Research, Volume 10 (21) (1982) 6553].

A variety of coupling methods are used in solid-phase peptide synthesis, as described by J. M. Stewart et al. ("Solid Phase Peptide Synthesis," Pierce Chemical Co., 1984). The most widely use approaches start with a substrate containing either a bonded benzyl ester or acyloxymethylphenylacetamidomethyl (so-called PAM) linkages. Addition of each successive amino acid occurs through reaction with an amino group linked to the silane to the carboxyl group of the subsequent amino acid.

These prior supports can be advantageously replaced by the novel, stable supports of this invention. A preferred stable support structure for these applications would be:

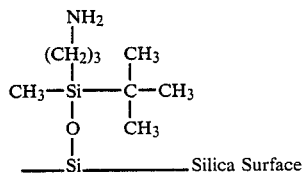

In peptide and protein sequencing, the compounds to be sequenced are usually first pre-adsorbed on a reactor filter disk containing a physically-held coating of a basic material such as Polybrene, a polymeric quaternary amine (available from Sigma Chemical Co.). This basic polymer retains the peptide or protein on the reactor disk and permits repetitive chemical degradation from the aminoterminus by Edman chemistry (see, "Methods of Peptide and Protein Microcharacterization—A Practical Handbook," J. E. Shively, ed., Hunara Press, Clifton, NJ, 1986). A major disadvantage of current technology is that yields in this repetitive operation can be significantly less than quantitative, partially due to "washout" or loss of the polymer from the disk during sequencing. This polymer loss from the disk limits the length of sequence that can be determined.

A stable, covalently-bound quarternary-amine, sterically protected support structure of this invention provides a superior means for sequencing operations, either from silanized reaction disks, or from a thin bed of silane-modified particles. The interactive functional groups are incorporated as $R_1$ groups in the silane molecule.

The Reaction

Reaction of the sterically-protecting silanes with the substrate may be carried out under a variety of conditions. Reaction can be performed in the vapor phase if sufficient vapor pressure of the silane can be generated. Elevated temperatures may be required in some cases. Normally, reactions are performed in suitable dry organic solvents, sometimes in the presence of a suitable catalyst or acid acceptor. Finally, reactions sometimes can be performed with the "neat" silane liquid, at elevated temperatures, if required, to increase the reaction rate. A general discussion of the reaction of silanes with the surface of chromatographic supports is given in Chapter 7 of "An Introduction to Modern Liquid Chromatography" (L. R. Snyder and J. J. Kirkland, John Wiley and Sons, New York, 1979). Additional details on the reaction of silanes with porous silicas is found starting on page 108 of, "Porous Silica" (K. K. Unger, Elsevier Scientific Publishing Co., New York, 1979). General discussions of silane reactions with a variety of materials are given in. "Chemistry and Technology of Silicones" (W. Noll, Academic Press, New York, 1968).

A preferred approach is to perform the reaction in a suitable solvent. In the case of halo-silanes, the reaction is conveniently carried out in a suitable dry organic solvent at elevated temperatures or at the boiling point of the solvent. An excess of the silane typically is used for the reaction, the actual level of excess depending on the rate of reaction. Fast reactions may require only a 20-50% equivalent excess, based on the moles of substrate surface atoms to be reacted; slow reactions may require 2-10-fold equivalent excess of silane to produce a high yield of desired covalently-bonded groups in a convenient reaction time.

An acid-acceptor or catalyst is desirable in the reaction of halo-silanes to greatly increase the reaction rate and improve yields of the desired bonded phase. A discussion of the role of the basic acid-acceptor and the solvent in the silanization of silicas is given by Kinkel et al. [J. Chromatogr., Volume 316 (1984) 193]. The mode of action for these acid-acceptor bases also is postulated in this publication. Typical acid-acceptors include pyridine, triethylamine, 2,6-lutidine, and imidazole. These nucleophile compounds are usually added in excess (e.g., two-fold equivalence) to the reaction, relative to the amount of silane used. However, there is some evidence that the rate of reaction of the silane with the substrate may be slowed if the concentration of acid acceptor is so large that adsorption of this material on the surface of the substrate tends to inhibit access of the reactive silane.

The solvent itself has an important role in the reaction of the silanes of this invention. In the case of monofunctional silanes, it has been postulated by Kinkel et al. (ref. above) that solvents with both pronounced Lewis acid and Lewis base characteristics should facilitate the reaction. Such a relationship for sterically-protecting silanes has not yet been established.

Reactions can be performed with sterically-protecting halo-silanes in refluxing toluene or xylene with pyridine as the acid acceptor. The solvents should be carefully dried to prevent hydrolysis of the silane, and the reaction should be performed under a blanket of dry inert gas, such as nitrogen. Depending on the silane used, reactions carried out in this manner may required as long as 3-4 days before equilibrium conditions are obtained.

Reactions in dichloromethane, acetonitrile, and N,N-dimethylformamide are also effective, particularly when bases such as imidazole and triazole are used as acid acceptors. Apparently, these nucleophiles are capable of forming intermediates with organohalosilanes, so that the resulting nucleophilic coordination lengthens the Si—X bond to enhance the attack on the substrate surface.

Highly reactive silanes such as amino- and trifluoroacetoxysilanes may react with siliceous substrates faster than halo-silanes, but yields of subsequent ligands are comparable as long as the reactions are allowed to go to completion. Trifluoroacetoxysilanes may be reacted in dichloromethane with 2,6-lutidine as the acid acceptor, according to the procedures described by Corey et al. [Tetrahedron Lett., Volume 22 (1981) 3455].

Alkoxy-silanes react somewhat more slowly with substrates than halo-, amino- and the other more aggressive silanes; consequently, these reactions are conveniently carried out by somewhat different procedures. A preferred procedure for silanizing siliceous substrates is to place the substrate in a flask fitted with a distillation head, add xylene (or toluene), and heat to reflux. The low-boiling water/solvent azeotrope is removed. This step places the system in a very dry state, to insure that the subsequent silanization will proceed in the desired manner. The alkoxy-silane is then added to the flask (either neat or in dry xylene (or toluene), and the flask contents again heated to reflux. At this point a low-boiling azeotrope again is in evidence, as result of alcohol being formed from the reaction of the alkoxy-silane with the substrate. The low-boiling azeotrope is continuously (or in steps) removed from the refluxing overhead until the boiling point assumes that of the pure xylene (or toluene), indicating that the reaction is complete. Generally, the reaction of alkoxy-silanes with siliceous substrates does not require the addition of acid-accepting catalysts, but in some cases a mild basic catalyst (e.g., pyridene) is beneficial.

The reaction of hydroxysilanes with hydroxylated substrates proceeds with the formation of water as the reaction product. Thus, reaction conditions should be used that remove water from the reaction mixture so that the reaction is driven to completion. In this case, reaction solvents can be used that cause a low-boiling azeotrope to be formed; this azeotrope can be removed in much the same manner as described for the alkoxy-silane above. Conditions for the reaction must be carefully controlled; otherwise, the hydroxysilane can react with itself or polymerize, creating undesired reaction products. One way to minimize polymer formation is to maintain the hydroxysilane concentration at the relatively low level, to encourage reaction of the hydroxysilane with the substrate rather than with itself. With this approach, the reaction can be initiated with a less-than-stoichiometric amount of hydroxysilane, then additional silane added during the reaction as required to drive the reaction to completion.

Reaction of sterically-protecting silanes with organic hydroxylated polymers proceeds similarly to that for siliceous substrates, except that the selection of solvent and reaction conditions must be adjusted to take into account the nature of the organic polymer. An example of the conditions required can be found in S. Hjertin et al. [J. Chromatogr., Volume 354 (1986) 203] for the reaction of gamma-glycidoxypropyltrimethoxysilane with Sepharose 4B, hydroxylated organic polymer.

The reaction of sterically-protecting silanes with other types of substrates may proceed differently and require modifications in the reaction approach. For example, hydroxylated chromium dioxides show little or no tendency to react with halo-silanes. However, such material can be made to react readily with silanes where X=hydrogen atoms (see for example, U.S. Pat. No. 3,939,137). Alternatively, alkoxy-silanes can be made to react with chromium dioxide in the manner described in Neth. Appl No. NL 75/14524, 22 June 1976, Ger Offen. No. DE 2,459,766 1 July 1976, and U.S. Pat. No. 4,177,317.

Complete coverage of the substrate by sterically-protecting silane is generally desired. The degree of coverage is largely a function of the population of reactive sites on the substrate and the surface area of the substrate. In the case of fully hydroxylated silica surfaces, about 8 $\mu$mol/m$^2$ of potentially reactive SiOH groups are present on the surface. However, because of the bulk or steric effects associated with the R, $R_1$ and $R_2$ groups of the sterically-protecting silane, all of these SiOH groups cannot be reacted.

However, it is not required that a substrate surface by fully covered. In some applications, a low-to-modest concentration of organic ligand is desired on the surface. To achieve this, the reaction is carried out with a less-than-stoichiometric amount of silane relative to the amount that would result for a fully reacted surface. The resulting support structures of this invention still exhibit a high degree of stability towards hydrolytic degradation.

Characterization of Support Structures

The configuration of bonded silanes on siliceous products can be characterized by 29-Si and 13-C cross-polarization magic-angle-spinning nuclear magnetic resonance spectroscopy (CP-MAS NMR) and diffuse reflectance infrared Fourier transform spectroscopy (DRIFT). Two examples of these techniques and their use for characterizing silicas and silane-modified silicas can be found in E. Bayer et al. (J. Chromatogr., Volume 264 (1983) 197–213) and J. Kohler et al. (J. Chromatogr., Volume 352 (1986) 275). In the characterization of solid materials by NMR, the line width of the signals is increased because of dipole-dipole interactions and the anisotropy of the chemical shift tensor. Dipolar decoupling and magic-angle-spinning techniques have been developed which allow spectra to exhibit much sharper signals that can be assigned to various atoms in the structure. For 13-C CPMAS NMR, information can be obtained about the identities and conformation of carbon atoms in an organosilane bound to the silica surface. If the substrate is an organic polymer, assignment of structures for the silane is more difficult. In 29-Si CP-MAS NMR, the orientation and bonding characteristics of the various Si atoms can be assigned.

DRIFT spectroscopy can be useful to identify the presence or lack of silanols in the modified surfaces of silica. For example, the disappearance of a sharp peak of 3700 cm-1 and the appearance of peaks in the 2800–3000 cm-1 region of the spectra indicate the loss of isolated silanols and the formation of C—H structure due to bonding by the alkyl ligand.

EXAMPLE 1

Preparation of a tert. Butyl-(di-n-butyl) Bonded Phase

Porous silica microspheres of five microns in particle size and 75Å pore size were obtained from E. I. du Pont de Nemours and Company (Wilmington, DE). This material was treated by the procedure of J. J. Kirkland and J. Kohler in U.S. Ser. No. 798,332 to yield a fully rehydroxylated material. Specifically, the procedure used was to take 60 g of the silica and add 600 mL of 200 ppm HF in water to a glass flask and reflux at 100° C. for 72 hours. The silica support was then washed with 1500 mL of water, 500 mL of acetone, and dried overnight at 110° C. under vacuum (30 in. Hg).

Four grams of this support were heated at 110° C. overnight under vacuum (30 in. Hg) to remove adsorbed water, and then placed in a dry nitrogen atmosphere. To this solid was added 40 mL xylene (dried over Type 4A molecular sieve), 1.89 mL pyridine, and 12.5 grams of chloro-t-butyl-di-(n-butyl)silane. This mixture was refluxed at 138° C. for 72 hours under a slow nitrogen purge. The mixture was then cooled and carefully washed with 300 mL each of toluene, methylene chloride, methanol, 50% methanol/water, and acetone. The resulting wet cake was then refluxed for 30 minutes, first in 60 mL of fresh tetrahydrofuran, and then fresh acetone. The resulting material was then dried at 110° C. under vacuum (30 in. Hg).

Approximately 2 grams of this packing was slurry packed into a 0.46×15 cm stainless steel tube according to procedures described in "Introduction to Modern Liquid Chromatography" (L. R. Snyder and J. J. Kirkland, John Wiley and Sons, NY, 1979, Chapter 5). The resulting chromatographic column was tested using an alternating isocratic/gradient elution solvent system composed of 0.1% trifluoroacetic acid (TFA) in distilled water (A) and 0.1% TFA in acetonitrile (B). The solvent was programmed from 0–100% B in 80 minutes, and isocratic measurements were performed at 50% B using 1-phenylheptane as a test compound. This mobile-phase cycle was repeated for the duration of the column-lifetime studies.

Retention time measurements were made as a function of the number of column volumes of solvent that had passed through the column. A decrease in retention time is a direct measure of the loss of silane bonded phase from the packing material in the column. Results from this test showed that the bonded phase sterically protected with the t-butyl group showed an insignificant loss of retention during the 3500 column volumes (96 hours) of these experiments. This stability was in strong contrast to the significant degradation of a comparable column of tri-n-butylsilane bonded phase that did not have the sterically-protecting t-butyl group.

The performance of the t-butyl-di-(n-butyl)-silane bonded phase column was further evaluated by separating five peptides (leucine enkephalin, angiotensin I, glucagon, insulin, and melittin) during the course of the column degradation test.

EXAMPLE 2

Preparation of tert. butyl-methyl-3-cyanopropyl Bonded Phase

Porous silica microparticles of seven micron particle size and about 300 Å pores were obtained as Zorbax PSM-300 from E. I. du Pont de Nemours and Company (Wilmington, DE). This material was rehydroxylated by the procedure detailed in Example 1, except that 75 ppm HF solution was used for this silica of lower surface area.

Six grams of this material were heated under vacuum (30 in. Hg) at 110° C. to remove adsorbed water, and then placed in a dry nitrogen atmosphere. To this solid substrate was added 60 mL of xylene (dried over Type 4A molecular sieve), 0.52 mL of dry pyridine, and 3.5 grams of chloro-t-butyl-methyl-3-cyanopropylsilane.

The reaction, workup and column packing procedures were the same as in Example 1.

The resulting chromatographic column was tested as in Example 1, and showed excellent stability over the 96-hour test period. The stability of this phase was markedly superior to that of a comparable dimethyl-3-cyanopropylsilane bonded phase packing that did not have the sterically-protecting t-butyl group. This result demonstrates the superior properties of the novel structures of this invention.

We claim:

1. A stable support structure comprising a substrate and a monofunctional silane containing a single sterically-protecting, dimethyl-substituted, tertiary carbon moiety attached to the silicon atom of the silane and additional functional groups, R, $R_1$, and $R_2$, covalently attached to the substrate, the silane being as follows:

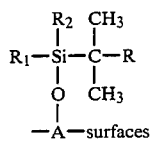

where R, $R_1$ and $R_2$ are alkane, substituted alkane, alkene, substituted alkene, aryl or substituted aryl, but specifically excluded are structures where $R=R_1=R_2=CH_3$; and A = a surface group of the substrate to which the silane is attached.

2. The support structure of claim 1 in which the substrate is a hydrated metal oxide, a hydrated metalloid-oxide, or organic polymer.

3. The support structure of claim 2 in which the substrate also includes a plastic which will flow under an applied stress and is stable to normal reaction temperatures.

4. The support structure of claim 2 in which the metal oxide and metalloid oxide substrates include silica, chromia and tin oxide.

5. The support structure of claim 2 in which the substrate is rigid material coated with silica.

6. The support structure of claim 1 in which the protecting groups are able to closely pack around its hydrolytically unstable —Si—O— groups of the silane attached to the substrate to protect this bond during use.

7. The support structure of claim 2 in which the protecting groups are able to closely pack around its hydrolytically unstable —Si—O— groups of the silane attached to the substrate to protect this bond during use.

8. The support structure of claim 7 wherein the R groups are different.

9. A stable support structure for peptide synthesis comprising a silica substrate, and a silane, arrange as follows:

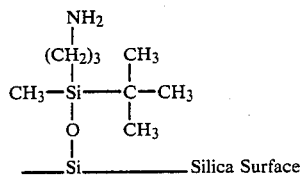

covalently attached to the silica substrate.

10. The support structure of claim 1 wherein R, $R_1$, or $R_2$ = —CH=$CH_2$.

11. The use of the structure of claim 1 as a chromatographic support.

12. The support structure of claim 1 wherein the $R_1$ or $R_2$-group includes as ion-exchange group.

13. The support structure of claim 1 wherein the $R_1$ or $R_2$-group includes a site for attachment of a ligand useful in affinity chromatography.

14. The support structure of claim 1 wherein the $R_1$ or $R_2$-group includes a site for attachment of catalysts.

15. The support structure of claim 1 wherein the $R_1$ or $R_2$-group provides hydrophobic binding sites suitable for reverse-phase or hydrophobic in action chromatography.

16. The support structure of claim 1 wherein the $R_1$ or $R_2$-group provides hydrophilic sites suitable for use in size-exclusion chromatography.

17. The support structure of claim 12 wherein the ion-exchange group is a weak anion-exchange, strong anion-exchange, weak cation-exchange or strong cation-exchange group.

* * * * *